US007455492B2

(12) United States Patent
Weis

(10) Patent No.: US 7,455,492 B2
(45) Date of Patent: Nov. 25, 2008

(54) MULTI-TROLLEY CONTAINER CRANE WITH BI-LEVEL TRACK SWITCHING CAPABILITY

(75) Inventor: Otto Weis, Oberpleichfeld (DE)

(73) Assignee: Noell Crane Systems GmbH, Würzburg (DE)

( * ) Notice: Subject to any disclaimer, the term of this patent is extended or adjusted under 35 U.S.C. 154(b) by 124 days.

(21) Appl. No.: 10/550,588

(22) PCT Filed: Mar. 22, 2004

(86) PCT No.: PCT/DE2004/000583

§ 371 (c)(1),
(2), (4) Date: Oct. 19, 2005

(87) PCT Pub. No.: WO2004/083097

PCT Pub. Date: Sep. 30, 2004

(65) Prior Publication Data

US 2006/0182526 A1 Aug. 17, 2006

(30) Foreign Application Priority Data

Mar. 22, 2003 (DE) ................................ 103 13 769

(51) Int. Cl.
*B63B 27/00* (2006.01)
*B65G 67/60* (2006.01)
*B61B 3/00* (2006.01)

(52) U.S. Cl. ....................... 414/140.3; 212/312; 104/98

(58) Field of Classification Search .............. 414/140.3, 414/140.4, 141.3, 141.4, 141.5, 141.6, 142.6, 414/142.7, 254; 212/316, 319, 328; 104/97, 104/98, 126, 128, 127, 130.04, 130.07; 280/6.152, 280/6.153, 6.155, 6.156, 475; 180/20, 209
See application file for complete search history.

(56) References Cited

U.S. PATENT DOCUMENTS 3,783,792 A * 1/1974 Cullom ...................... 104/128
3,926,126 A * 12/1975 Voss ...................... 104/130.04
4,457,403 A * 7/1984 Ream ......................... 187/244

(Continued)

FOREIGN PATENT DOCUMENTS

DE 152 363 10/1902

(Continued)

OTHER PUBLICATIONS

International Search Report.

*Primary Examiner*—Saul J. Rodriguez
*Assistant Examiner*—Gregory W Adams
(74) *Attorney, Agent, or Firm*—Collard & Roe, P.C.

(57) ABSTRACT

The invention relates to a multiple trolley container crane having at least two trolley tracks (6, 7) disposed one on top of the other, on which trolleys (8) having running wheels, drive devices, and lifting devices move. Characterized in that running wheels (20) that can be laterally retracted and extended, and an integrated lifting system (21, 22, 24, 25, 26) are disposed on the trolleys (8) on the trolley tracks (6, 7), with which they support themselves on or next to the trolley tracks (6, 7) and thereby get from the lower to the upper trolley tracks (6, 7) and vice versa.

Figure 1:
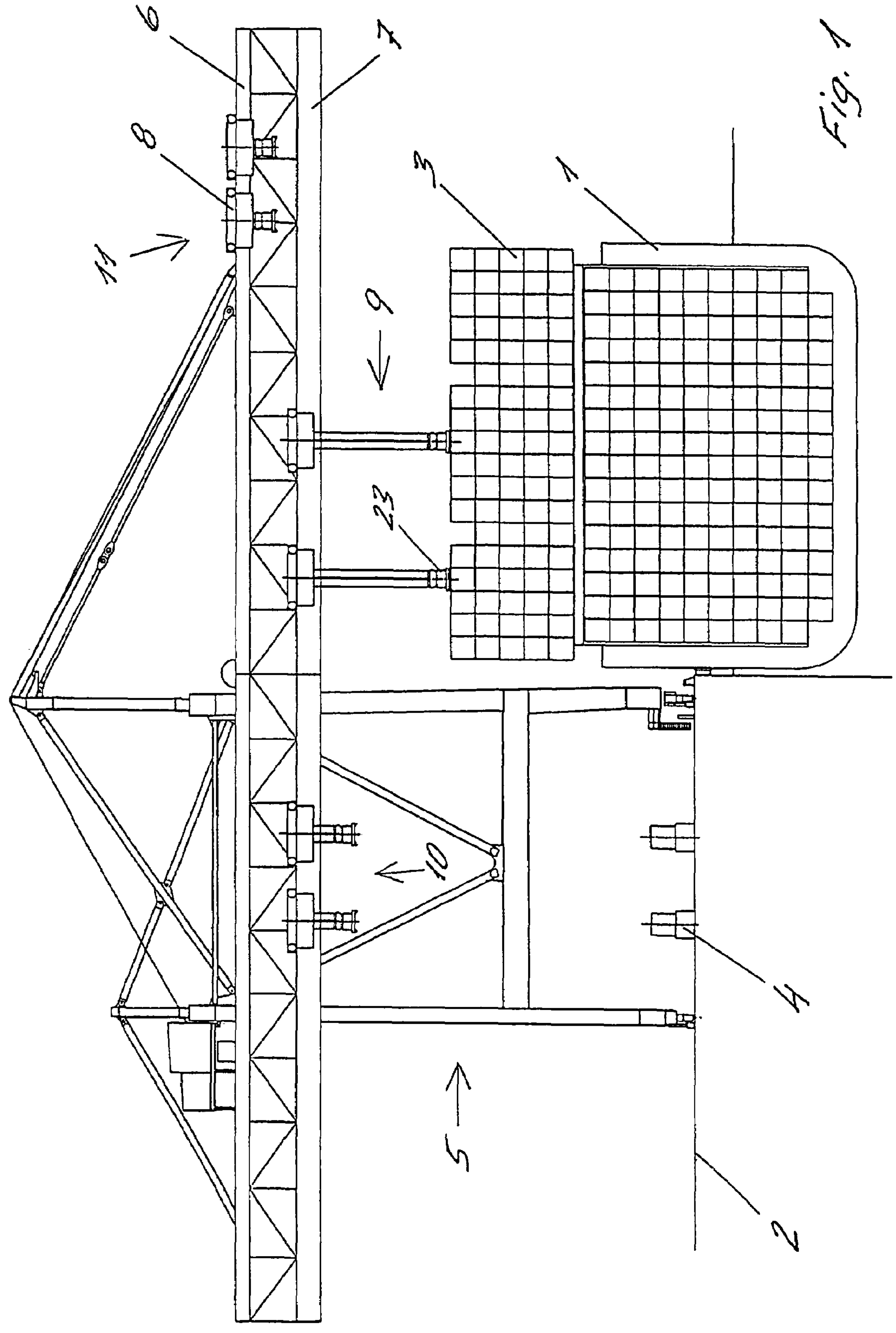

The invention is suitable for fast loading and unloading of container ships, where several containers are supposed to be loaded and unloaded from them at the same time (Figure).

9 Claims, 6 Drawing Sheets

U.S. PATENT DOCUMENTS

| | | | | | |
|---|---|---|---|---|---|
| 4,750,429 | A | * | 6/1988 | Mordaunt et al. | 104/98 |
| 4,897,011 | A | * | 1/1990 | Brower | 414/459 |
| 5,896,816 | A | * | 4/1999 | Dinger et al. | 104/263 |
| 5,931,625 | A | * | 8/1999 | Tax et al. | 414/140.3 |
| 6,530,492 | B2 | | 3/2003 | Weis | |

FOREIGN PATENT DOCUMENTS

| | | |
|---|---|---|
| DE | 74 28 025 | 5/1975 |
| DE | 4 307 254 | 9/1994 |
| DE | 197 03 286 | 8/1998 |
| DE | 298 24 751 | 6/2002 |
| EP | 0 167 235 | 1/1986 |
| WO | WO 00/48937 | 8/2000 |

* cited by examiner

MULTI-TROLLEY CONTAINER CRANE WITH BI-LEVEL TRACK SWITCHING CAPABILITY

CROSS REFERENCE TO RELATED APPLICATIONS

Applicant claims priority under 35 U.S.C. §119 of German Application No. 103 13 769.6 filed on Mar. 22, 2003 Applicant also claims priority under 35 U.S.C. §365 of PCT/DE2004/000583 filed on Mar. 22, 2004. The international application under POT article 21(2) was not published in English.

The invention relates to a multiple trolley container crane having at least two trolley tracks disposed one above the other, in accordance with the preamble of the first claim.

The invention is suitable for cranes in which several trolleys are disposed on different trolley tracks, whereby there is the possibility that the trolleys switch from one trolley track to another. The system is particularly suitable when the possibility is supposed to exist that several trolleys switch their tracks at the same time, move independently of one another, and no specific location is required for changing the trolleys from one trolley track to the other. The invention can be used in very particularly advantageous manner when several trolleys pick up containers at the same time and, traveling one behind the other, bring the containers to the planned location. This can take place both from a container ship to a vehicle that is standing ready, or to a collection area, and vice versa.

Since container ships are becoming larger and larger, and because of the docking times in the harbors, there is a demand for loading and unloading as many containers as possible within the shortest possible amount of time, and at a high speed. It is true that several container bridges can be placed next to one another against the container ships along the longitudinal side of the ship, but these are predominantly single-trolley container bridges, i.e. one trolley picks up the container from the ship and brings it to the pier, or vice versa. In the case of large container ships, this means long docking times.

A container crane having two trolleys is known from DE 298 24 751.8, which trolleys can work independently of one another. The proposed variant is limited to two trolleys, however, so that several container cranes must be used for fast unloading.

A load loading crane is known from DE 43 07 254 A 1, in which three trolleys are disposed on a container bridge, whereby two lifting units that can be moved in their longitudinal direction, having a lifting mechanism and a transfer unit are disposed for the load exchange. In the case of this system, the advantage of the transport path division is canceled out by the multiple release and gripping of the container.

A transport system is known from EP 0 167 235 A 1, with which several containers, one after the other, can be loaded onto and unloaded from a ship, but the trolleys always move on the same tracks, so that while several trolleys can load and unload containers at the same time, the system has the disadvantage that first, all of the loading and unloading procedures must have been completed, before the next unloading and unloading procedures can be carried out.

In order to move several trolleys on different tracks at the same time, without these hindering one another, a portal crane having circulating trolleys is known from WO 00/48 937, in which several trolleys are disposed next to and on top of one another, and move on different tracks in two different level heights. A disadvantage of this portal crane having circulating trolleys, however, is that the upper trolleys with the hoists only perform the lifting and lowering movements of the containers, and the trolleys on the lower tracks only take over the transport of the containers to and from. It is true that several containers can be lifted and transported at the same time, but different trolleys are required for the transport and for lifting, which trolleys handle the lifting and transport procedure with a division of labor. As a result, a multiple transfer of containers on the container crane is required, and this results in an increased use of materials and error sources. Furthermore, in the case of two or more lifting and lowering trolleys, there are significant crossover problems between the lifting and transport procedure. It is also disadvantageous that every container must be brought into the uppermost trolley lifting position in order to be transferred and transported further. It is furthermore disadvantageous that a switch in track is always possible only at the end of the tracks, so that significant distances must be traveled by the trolleys.

It is therefore the task of the invention to develop a multiple trolley container crane on which several trolleys can move at the same time, at different height levels, whereby the transport of several containers is supposed to be possible with a simple method of construction and procedure.

This task is accomplished by means of a multiple trolley container crane that has the characteristics of the first claim.

Dependent claims reproduce advantageous embodiments of the invention.

The solution according to the invention provides for a multiple trolley container crane having at least two trolley tracks disposed one on top of the other, on which trolleys having running wheels, drive devices, and lifting devices move, which crane is characterized in that the trolleys on the trolley tracks have running wheels that can be laterally retracted and extended. These running wheels are retracted during the switch of the trolley from one trolley track to the next higher trolley track, and are extended again on the next higher trolley track. Fundamentally, at least two trolley tracks disposed on top of one another must be disposed on each side of the trolley. It is also possible to dispose more than two trolley tracks one on top of the other. Every trolley has an integrated lifting system with which it can support itself on or next to the trolley tracks and thereby get from one trolley track to the other trolley track. In this connection, it is possible that the trolley moves from an upper trolley track to the one located below it. The lifting system can not only engage on a trolley track, i.e. in front of or behind the running wheels, it can also engage on a suitable location next to a trolley track. After the lifting system is supported on or next to the trolley track, the lifting system transports the running trolley, with the wheel pairs retracted, up or down, and afterwards, the wheel pairs are extended again, after the lifting movement, and the trolley is lowered to the running surface. Afterwards, the lifting system can be retracted again.

When only two trolley tracks are present, the track width of the running wheels can be adjusted by means of fixed stops.

Telescoping cylinders that are disposed next to or under each running wheel are suitable as an integrated lifting system.

However, gear wheels that are used to move racks are also suitable; they bring about an upward or downward slide of the trolley, in each instance.

Every trolley is provided with a drive device; furthermore, there is a lifting device on every trolley, which devices can be spreaders, for example, having gripping elements, for example twistlocks.

It is advantageous to dispose several trolleys behind one another on the upper and/or the lower trolley track. In this way, several trolleys can move on the upper trolley tracks, without a load, above the trolleys on the lower trolley tracks, and several trolleys that are carrying their loads can move on the lower trolley tracks, next to one another and at the same time.

For stability, trolley track connections can be disposed between the two sides of the trolley tracks, between the upper trolley tracks and the lower trolley tracks.

Furthermore, it is advantageous to structure the trolleys so that they have extendable power supplies. In this way, it is possible to perform the lifting and the lowering procedure of the trolley from one track to the other, without any power supply hindering this procedure. The power is then made available to the trolley in question by way of a storage unit, for example a battery. The lifting and lowering procedure of the trolleys can be controlled by way of radio control. To control the procedures of the trolleys during container loading and unloading, one or more crane operator's cabin(s) can be disposed on the container crane, in fixed or movable manner. It is advantageous to undertake the operation of the trolleys automatically, whereby monitoring and regulation devices for automatic pick-up and set-down of the containers and for preventing collisions should advantageously be disposed on the container crane or on the trolleys.

The multiple trolley container crane has the advantage of a simple method of construction, whereby several trolleys are put into use at the same time, whereby a simultaneous switch of several trolleys on the trolley tracks is possible, and the function of the trolleys can take place independently of one another, to the greatest possible extent, whereby no specific location is necessary for switching the trolleys from one trolley track to the other.

In the following, the invention will be explained in greater detail using five figures and an exemplary embodiment. The figures show:

FIG. 1: Multiple trolley container crane having two trolley tracks and two double trolleys, unloading a ship.

Figure 2:
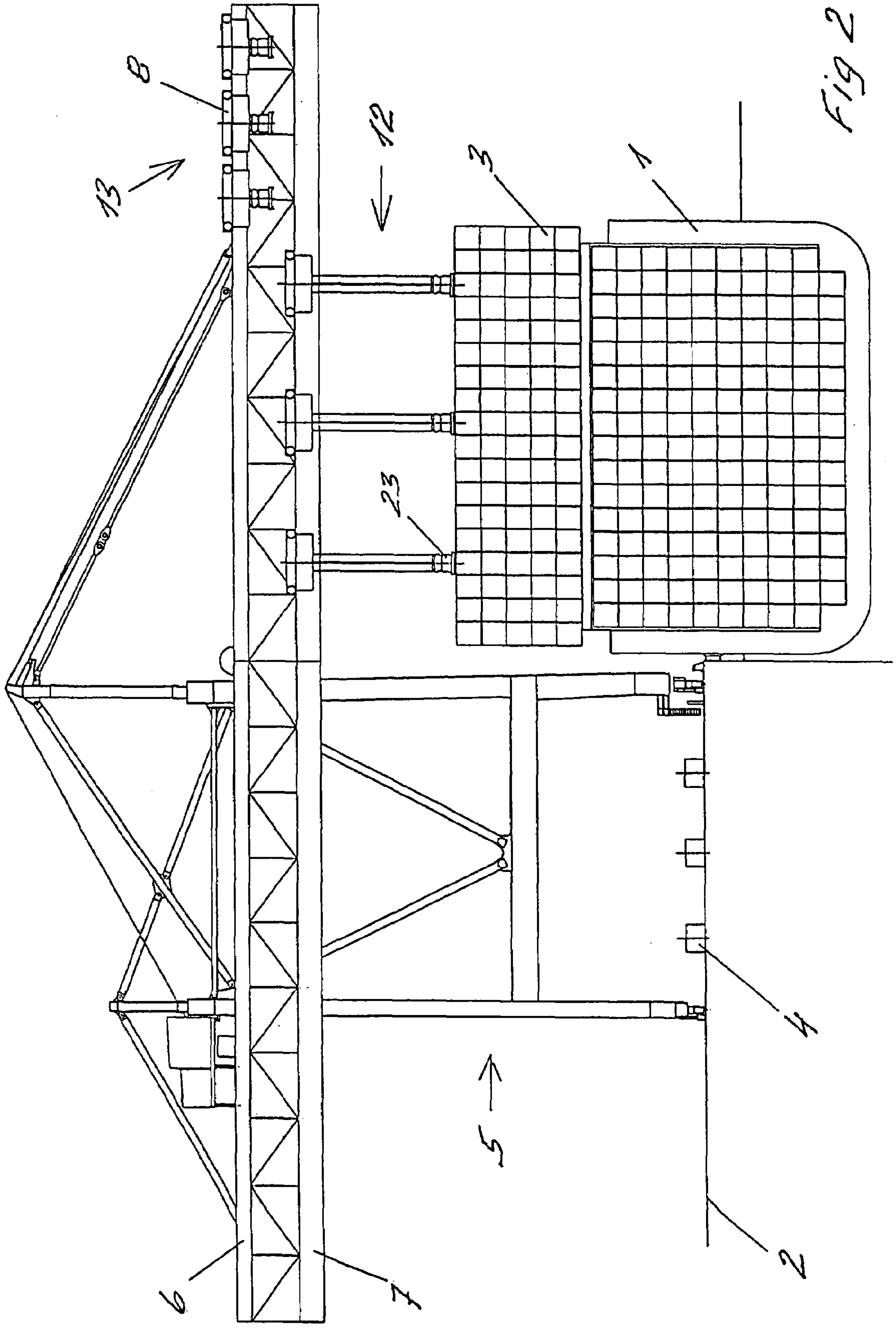

FIG. 2: Multiple trolley container crane having two trolley tracks and three triple trolleys, unloading a ship.

Figure 3:
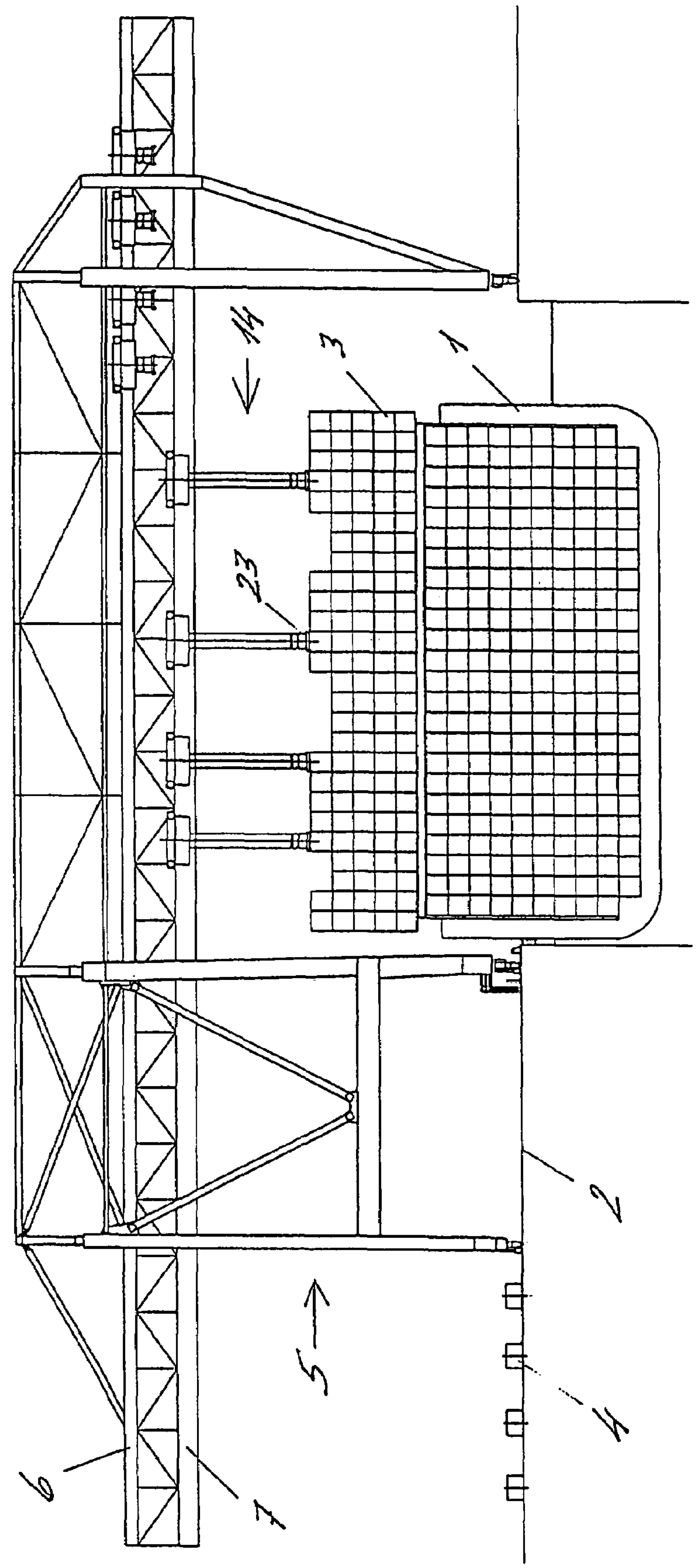

FIG. 3: Multiple trolley container crane having two trolley tracks and two quadruple trolleys, unloading a ship.

Figure 4:
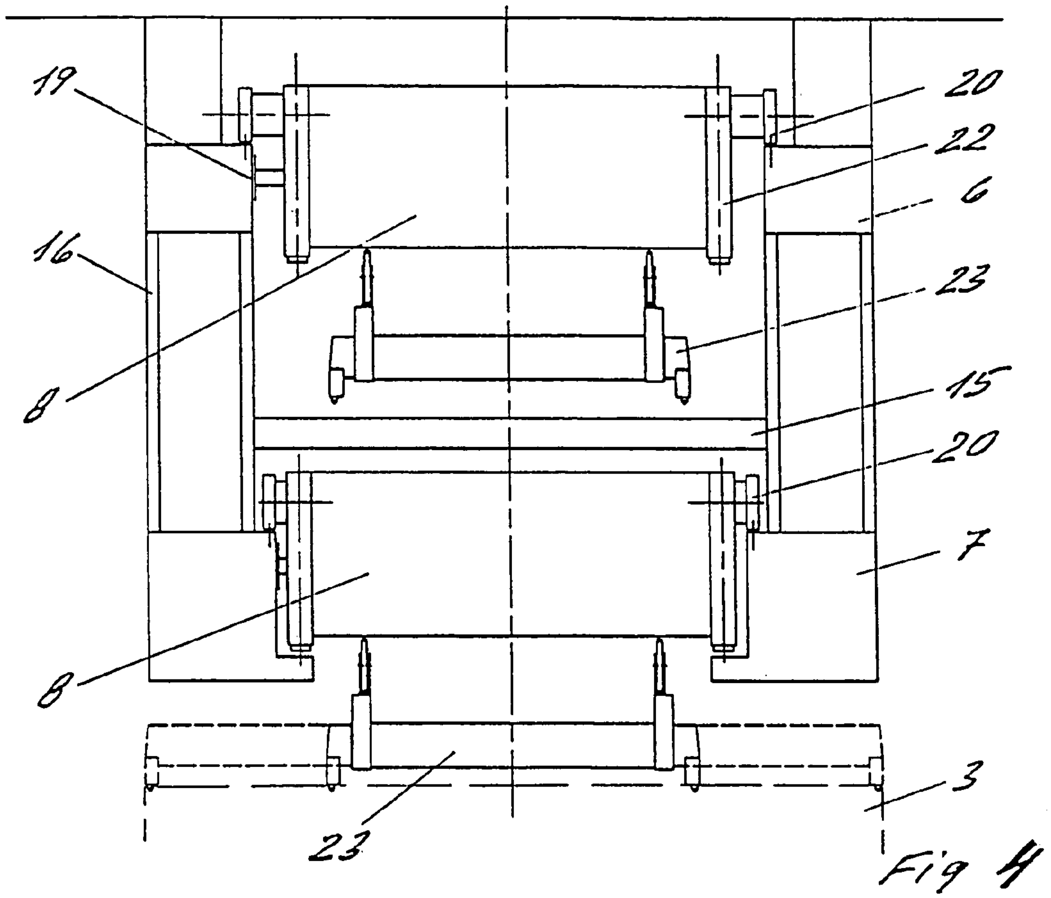

FIG. 4: Two trolleys, one above the other, on two trolley tracks, with retracted telescoping cylinder.

Figure 5:
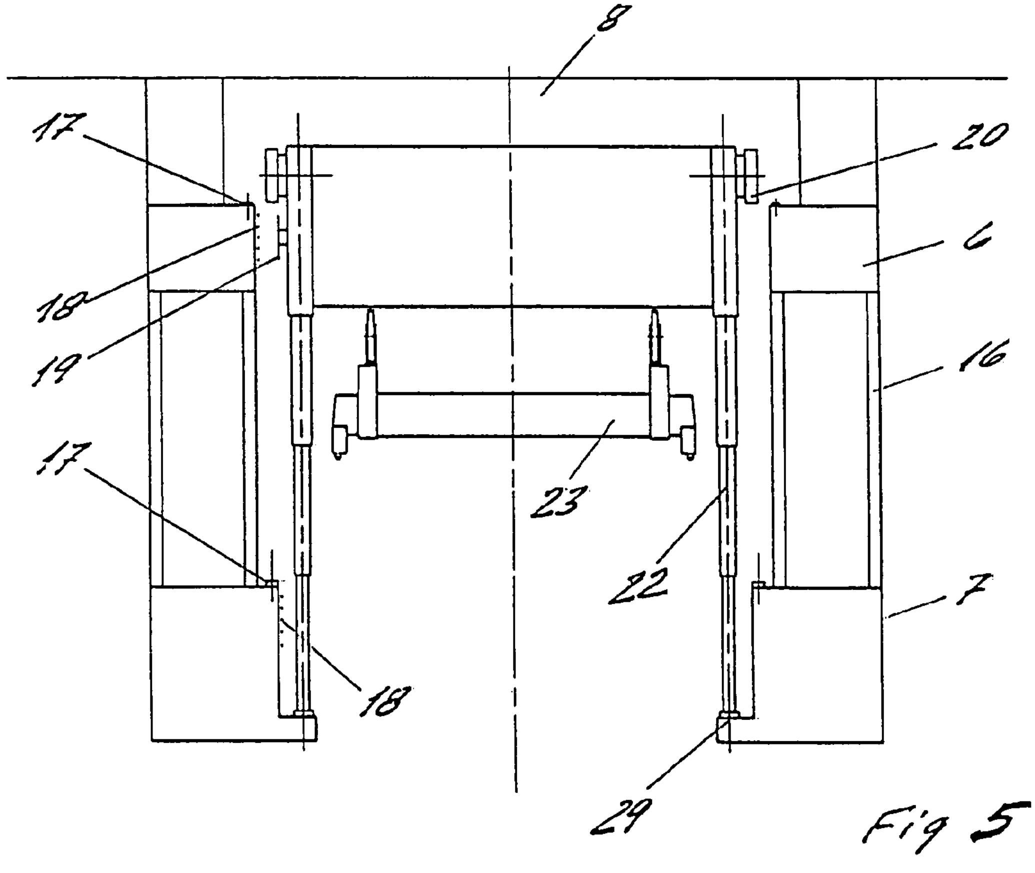

FIG. 5: Trolley with extended telescoping cylinder and retracted running wheels, next to a trolley track.

Figure 6:
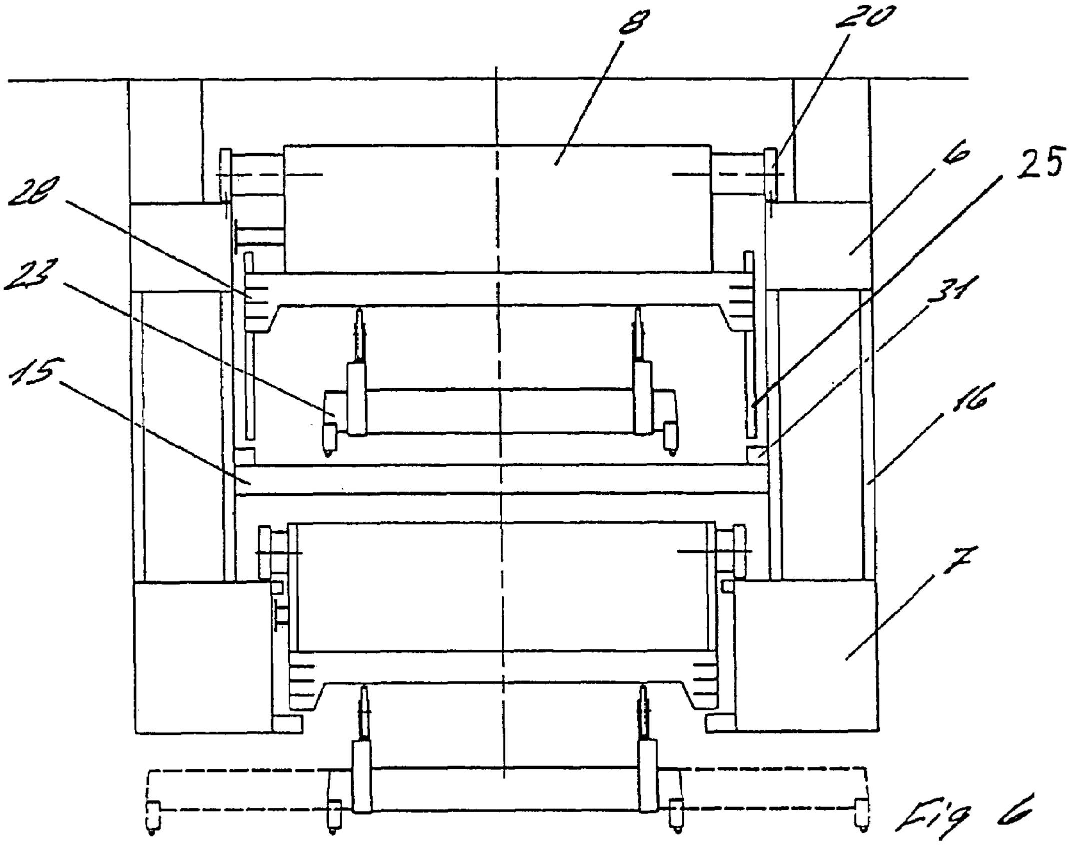

FIG. 6: Two trolleys, one above the other, on two trolley tracks, with rack lifting system retracted and ready for operation, respectively.

Figure 7:
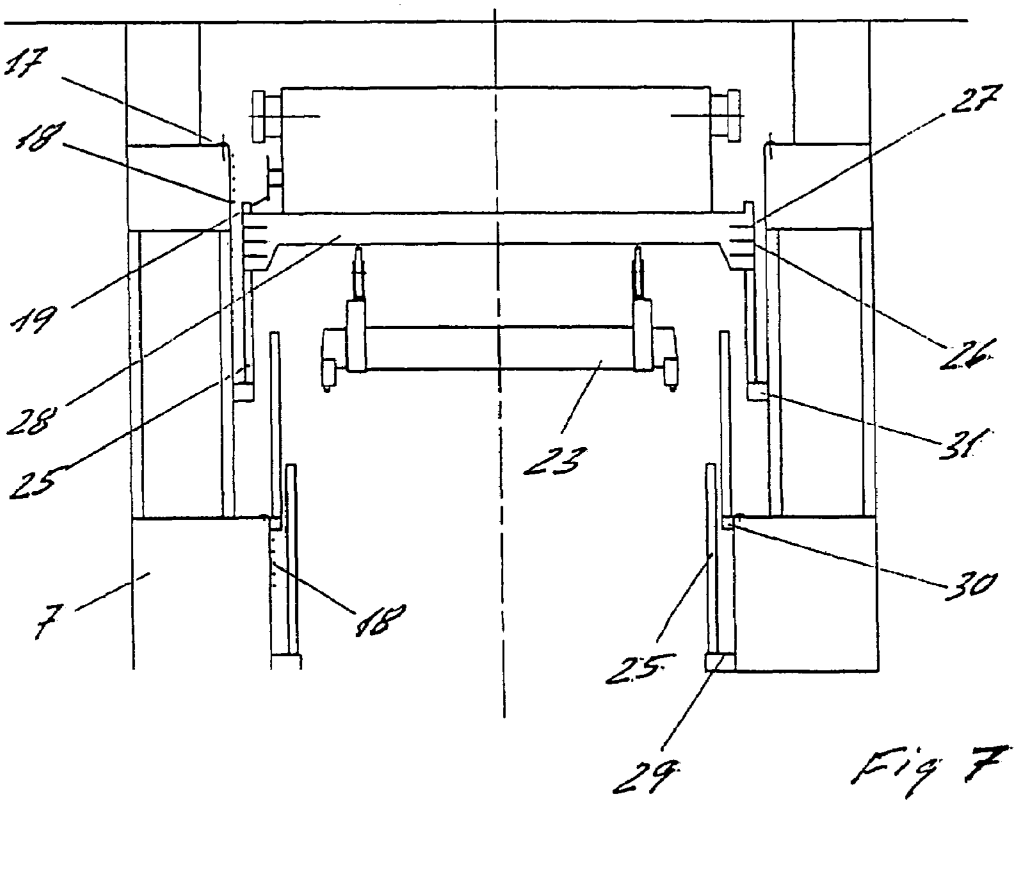

FIG. 7: Trolley with three-step rack lifting system and retracted running wheels, next to the trolley track.

Figure 8:
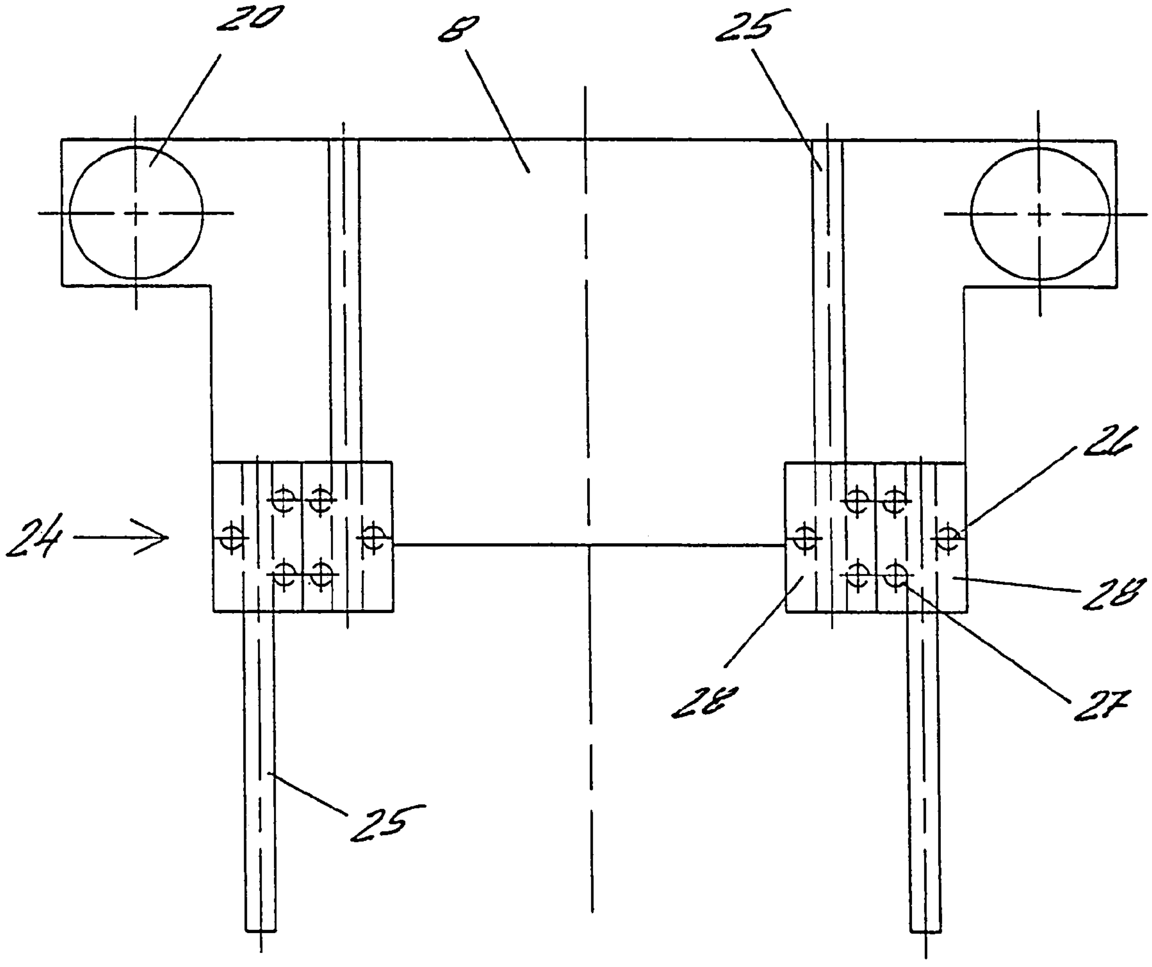

FIG. 8: Trolley in side view, with integrated rack lifting system.

FIG. 1 shows a container ship 1 at the pier 2, which ship is loaded with containers 3, whereby a container bridge 5 is performing the unloading process. Six trolleys 8 are disposed on the container bridge 5, in three trolley pairs 9, 10, 11, whereby one trolley pair 11 is disposed on the upper trolley track 6 with the lifting mechanism retracted, and stands ready for being lowered onto the lower trolley track. Two trolley pairs 9, 10 are located on the lower trolley track 7. The trolleys 9 have lowered their spreaders 23 onto the containers 3, and are lifting the latter out from the cargo hold of the ship 1. After the trolleys have been moved in the direction towards the container transport vehicle 4, lowering of the containers 3 takes place. The trolley pair 10 is ready to be lifted onto the upper trolley track 6. For loading the ship 1, the transport takes place in the opposite sequence.

FIG. 2 shows the container ship 1, from which containers 3 are being removed by three trolleys 12, which are moving on the lower trolley track 7, whereby additional trolleys 13 are disposed on the upper trolley track 6, which stand ready to be moved onto the lower trolley track 7. The container bridge 5 spans three transport container devices 4, each of which can be loaded at the same time.

FIG. 3 shows a container bridge 5 having eight trolleys 8, whereby four trolley pairs 14 are located in the waiting position on the upper trolley track 6, and four trolley pairs are removing the containers 3 from the ship 1, on the lower trolley track 7. Four container transport vehicles 4 stand ready for loading, under the container bridge 5.

FIG. 4 shows two trolleys 8, which are disposed on top of one another, whereby the lower trolleys 8 with its retracted running wheels 20 moves on the lower trolley track 7, and its spreader 23 carries a container 3. Another trolley 8 with extended trolley running wheels 20 is moving on the upper trolley track 6. As a lifting system, telescoping cylinders 22 are disposed next to the running wheels 20, which cylinders can be seen on both trolleys 8, in the retracted state. The spreader 23 of the upper trolley 8 is also retracted. A current collector 19 that can be extended to the contact line 18 is disposed between the trolleys 8 and the container bridge 5, so that power can be collected if there is a difference in width between the trolley tracks 6, 7.

For stabilization, track connections 15 are disposed between the trolley tracks 6, 7.

FIG. 5 shows the current collector 19, the running wheels 20, and the spreader 23 in the retracted state, since the running trolley 8 is being lifted from the lower track 7 to the upper track 6, by means of extended telescoping cylinders 22. In this connection, the telescoping cylinders support themselves on a support surface 29 next to the lower trolley track 7. After the running wheel extension position has been reached, all of the running wheels 20 extend out to the track width of the upper trolley track 6, the telescoping cylinder 22 lowers down until the running wheels 20 set down onto the trolley track rail 17.

FIG. 6 shows, as also shown in FIG. 4, two trolleys 8 on top of one another, on the trolley tracks 6 and 7. Racks 25 in the displacement carrier 28 are disposed next to the running wheels 20, as a lifting system 24. The racks 25 are located in a parking position that is advantageous for the turnover time, in the case of the upper trolley 8. In the case of the lower trolley 8 on the trolley track 7, the racks 25 and the displacement carrier 28 are completely retracted.

FIG. 7 shows the integrated rack lifting system 24 in the three lifting positions, whereby the lifting steps are carried out by way of the dually provided horizontal displacement carrier 28 with the racks 25, gear wheels 26, and the guide rollers 27. During the first lifting procedure, the racks 25 support themselves on the support surfaces 29. After the first lift has been completed, a side displacement is performed with the second horizontal displacement carrier 28. The lifting procedure is continued by way of the support profile 30 and afterwards by way of the support carrier 31, until the trolley 8 has reached the proper height for extending the running wheels 20.

FIG. 8 shows a trolley 8 in a side view, with the running wheels 20 and the rack lifting system 24, consisting of two pairs of displacement carriers 28 with racks 25, gear wheels 26, and guide rollers 27 that are retracted and extended, respectively, which are disposed in the head part of the displacement carrier 28. The head part of the displacement carrier 28 consists of two parts, whereby each part carries a rack 25 and can be separately retracted and extended horizontally.

List of reference symbols used:

1. container ship

2. pier

3. container

4. container transport vehicle

5. container bridge

6. upper trolley track

7. lower trolley track

8. trolley

9. two trolleys—removal from ship

10. two trolleys—trolley lift

11. two trolleys—trolley lowering

12. three trolleys—removal from ship

13. three trolleys—circulation

14. four trolleys—system

15. track connection

16. track combination

17. trolley travel rails

18. current contact line

19. current collector

20. trolley running wheels

21. integrated telescoping cylinders, lifting system

22. telescoping cylinder

23. spreader

24. integrated lifting system, rack

25. rack

26. gear wheel

27. guide wheels

28. horizontal displacement carrier

29. support surface

30. support profile

31. support carrier

The invention claimed is:

1. A multiple trolley container crane comprising:

(a) at least upper and lower trolley tracks extending substantially parallel to each other;

b) at least one support surface disposed below said lower trolley tracks;

c) a plurality of trolleys for traveling on the trolley tracks, each trolley having laterally deployable and retractable running wheels, a driving device, and an integrated lifting system for supporting the trolley on or beside the trolley tracks and enabling the trolley to pass from the lower trolley track to the upper trolley track and vice versa such that when at least one of said plurality of trolleys moves from said lower trolley tracks to said upper trolley tracks said at least one trolley is positioned beside said upper trolley tracks, and wherein said at least one of said plurality of trolleys moves from said upper trolley tracks to said lower trolley tracks, said at least one trolley is positioned beside said lower trolley tracks wherein said integrated lifting system is configured to lift a trolley above at least one of said upper tracks and said lower tracks by contacting said at least one support surface; wherein the integrated lifting system for each respective trolley is selected from a group comprising vertically oriented cylinders or telescoping cylinders and racks with gear wheels or spokes.

2. The multiple trolley container crane according to claim 1, wherein the trolleys are disposed, one behind the other, on at least one of the upper trolley track and the lower trolley track.

3. The multiple trolley container crane according to claim 2, further comprising a plurality of track connections laterally disposed between the upper and lower trolley tracks.

4. The multiple trolley container crane according to claim 1, wherein a respective deployable power supply is disposed on each trolley on contact lines along the trolley tracks.

5. The multiple trolley container crane according to claim 1, wherein said at least one support surface for the integrated lifting system is disposed next to the tracks.

6. The multiple trolley container crane according to claim 1, wherein a plurality of storage units are built on each trolley, for lifting and lowering each of said plurality of trolleys.

7. The multiple trolley container crane according to claim 1, wherein lifting and lowering of containers is controlled via radio control from the crane operator's cab or from another location.

8. The multiple trolley container crane according to claim 1, wherein individual trolleys or a plurality of trolleys can be moved on the trolley tracks, individually or in groups.

9. The multiple trolley container crane as in claim 1, wherein said laterally deployable and retractable running wheels extend laterally in an axial and horizontal manner.

* * * * *